SIGNAL SELECTION AND SQUELCH CONTROL IN WIDEBAND RADIO RECEIVERS

Original Filed Jan. 7, 1964 2 Sheets-Sheet 1

INVENTOR.
LEONARD R. KAHN
BY Mattis & Hanfeld
ATTORNEYS

INVENTOR.
LEONARD R. KAHN
BY Mattis & Grayseal
ATTORNEYS

United States Patent Office

Re. 27,202
Reissued Oct. 26, 1971

27,202

SIGNAL SELECTION AND SQUELCH CONTROL IN WIDEBAND RADIO RECEIVERS

Leonard R. Kahn, Freeport, N.Y., assignor to Electrospace Corporation

Original No. 3,337,808, dated Aug. 22, 1967, Ser. No. 336,263, Jan. 7, 1964. Application for reissue July 22, 1969, Ser. No. 862,982
Int. Cl. H04b *1/10;* H04l *27/14*
U.S. Cl. 325—474 17 Claims

Matter enclosed in heavy brackets [ ] appears in the original patent but forms no part of this reissue specification; matter printed in italics indicates the additions made by reissue.

ABSTRACT OF THE DISCLOSURE

Improvement in communications receivers of the type having an intermediate frequency passband substantially wider than the bandwidth of the received signal, such improvement involving gating means comparing the energies in frequency related segments of the receiver passband, and passing as receiver output only such segments as have a different energy level (caused by signal presence) than the energy levels in other of the segments (caused by noise energy). Such gating means can also be employed for squelch control, with the receiver rendered sensitive when the energy levels in the passband segments are substantially different (i.e. signal energy is present) and squelched when the energy levels in the segments are substantially the same (i.e. only noise energy is present).

This invention relates to radio communications receivers, particularly wideband receivers used in mobile communications service where, because of frequency drift on the part of oscillators in the receiver or the associated transmitter, or because of Doppler shift induced by relative motion between the receiver and the transmitter, the bandwidth of the receivers must be considerably wider than theoretically required by the signal's modulation characteristic.

Other features of this invention relate to improved squelch circuit operation in wideband receivers, by means of which a receiver is automatically and effectively muted during pauses in signal transmission, without sacrifice in receiver sensitivity.

It is often necessary to utilize relatively wideband receivers to receive narrowband signals. Common reasons for this manner of operation include the following:

(a) Transmitter or receiver stability is poor and therefore the receiver must be wide enough to accommodate substantial carrier drift.

(b) Receiver tuning accuracy is insufficient to insure proper centering of the signal carrier.

(c) Variant relative motion occurs between the receiver and the transmiter, or the medium is in motion, thus creating Doppler shift. This factor is especially important in space communications.

(d) Plural transmitting stations, each operating in nominally the same channel and each serving to transmit the same intelligence to different geographical areas, give rise to severe interstation interference or so-called "echo" effects in some geographical areas.

At the present time many communications services use receivers with bandwidths considerably wider than modulation analysis would indicate to be necessary. For example, aeronautical air-to-ground links generally provide 30 to 40 kilocycles (kcs.) receiver bandwidth even though the signal itself is a double-sideband amplitude modulated (AM) signal with a maximum of 3 kcs. modulation (6 kcs. spectrum width). This is due to the fact that the signal path or paths may be subject to dissimilar environmental variations and thus the system must accommodate appreciable carrier drift.

The use of a wider receiver bandwidth creates an increase in noise level in the receiver. For thermal and shot noise, the noise power is a linear function of bandwidth in the frequency range of interest to most comunications engineers. Moreover, impulse noise, which may be more important in aircraft and other vehicular communications, increases as the square of the bandwidth. Thus, there is an appreciable loss in signal-to-noise ratio due to the use of wideband receivers.

In addition to the signal-to-noise problem of the signal channel the squelch control circuits are very important in mobile communications services and the difficulty of differentiating between the signal and the noise in order to operate the squelch circuit is a very severe problem.

In the final analysis, under normal operating conditions, the squelch circuit determines the sensitivity of the receiver. The receiver operator adjusts the squelch threshold so as to not be annoyed by the noise from the receiver. The natural tendency is to minimize annoyance by maintaining the squelch threshold higher than necessary. This desensitizes the receiver and therefore only relatively strong signals are heard.

An even more difficult problem is that of making intelligible a signal which is weaker than an interfering adjacent channel signal. One aspect of the present invention is the provision of means enabling effective selection of a signal that is weaker than an interfering signal in an adjacent channel.

A further problem addressed by this invention is the problem of sustained network reception by aircraft in flight. In order to cover large areas, aeronautical radio stations are very densely placed around the United States, providing an air-to-ground and ground-to-air communications network. These network stations, although nominally on the same channel, do not all operate on the same frequency but on some six frequencies spaced approximately 6 to 7 kcs. apart. The advantage of doing this is that while an aircraft flies from one location to another it picks up one station after another transmitting the same intelligence so that as one station fades out, another station will come in with a strong signal. The reason slightly spaced frequencies are used is so that they do not interfere with each other and cause fading patterns. Thus, those stations which operate on exactly the same frequency are geographically spaced far apart sufficiently so that while they are operating on the same frequency the aircraft at no time receives an appreciable signal from both stations.

This system for reducing interstation interference has one severe problem, there is often an echo which is mainly due to the difference in time of arrival of the audio wave at the various transmitter locations. Time of arrival differences arise because both cable and microwave types of transmission paths are used for the audio intelligence prior to ground-to-air transmission, often with facilities being switched or interchanged from time to time. The echo effect greatly degrades the speech quality of the received signal because the listener hears two or more signals many times, with the echo often being quite pronounced. Even more important is the fact that the echo effect almost completely destroys data accuracy at reasonable data transmission speeds. The improved signal selection technique of the present invention automatically selects a stronger signal and greatly attenuates any weaker signals, thus substantially obviating echo induced data inaccuracy.

One conventional method for improving signal-to-noise (S/N) and signal-to-interference (S/I) ratios in wideband receivers employed to receive relatively narrowband signals is to improve the frequency stability of receiving and ansmitting equipments so the bandwidth of the receiver an be correspondingly reduced. Frequency stabilization enerally takes the form of the use of crystal oscillators aving temperature controlled enclosures and the use of equency synthesizers wherein an output frequency is erived from one or more extremely stable oscillators by se of frequency dividers, frequency mixers, harmonic enerators, or other such devices.

However, such frequency stabilized equipment is genrally complex, bulky and expensive. For these reasons, s well as others, most mobile equipments do not incororate such devices and relatively poor frequency stability tolerated. Also, in the case of satellite or space comunications systems, the correction of the Doppler shift rrors is a very complex problem requiring a precise nowledge of the relative motion between the receiver and e transmitter, making such correction equipment inppropriate for many applications.

Concerning the aspects of the invention relating to imroved squelch operation, the conventional method of dermining whether a signal is being received is to measure utomatic volume control (AVC) voltage. If this oltage is greater than a certain value (the squelch threshld) then it is assumed that a signal is present. This techique has a very serious limitation and that is that it is ot possible to determine from a simple measurement of VC level whether the incoming wave is predominantly gnal or predominantly noise. Generally the receiver oprator must make an adjustment of his equipment to set a reshold point, above which level the incoming wave is onsidered to be predominantly signal.

The threshold adjustment must be made quite careilly because, if the threshold setting is made too low, oise energy of itself will often operate the receiver causig annoyance and fatigue of the operator. However, if e threshold level is set too high, weak signals will be nored and for practical purposes the sensitivity of the eceiver is degraded.

The optimum squelch level adjustment is hard to chieve and must be altered for variable conditions such s moving from a region of low noise level to one of high oise level, or vice versa. Also, the skill of the operator very important to the proper adjustment, making the perating characteristics of the receiver very sensitive to perator capabilities and other subjective considerations.

In practice of the present invention, the reeciver passand, e.g. the intermediate frequency (IF) spectrum, is eparated into a number of frequency related divisions or egments by a parallel array of bandpass filters or the ke. The various filter outputs are fed to gates such as iode detectors which automatically select only that part one or at times two adjacent filter outputs) of the receiver assband having the strongest energy level. The other filter utputs which would, at a given instant, merely add noise nd interference (as from weaker signals) are decoupled r blocked by operation of their respective gates, so form o part of the receiver output. In preferred forms of the ivention, if selection of the next to strongest filter output required on occasion, such as when an interfering sigal happens to be stronger than a desired signal, a similar et of gates is available to reject the strongest and select nly the next to strongest filter output. If desired, this ime technique can of course be extended to select only e third strongest filter output, etc.

The technique of dividing the IF spectrum by use of andpass filters or the like also provides an improved anner of squelch circuit operation. It is well known that e spectrum characteristic of resistor noise (thermal oise), tube noise (shot noise), or transistor noise (shot nd thermal noise) is very flat, i.e. the spectral density f the noise energy is constant for relatively narrow bandidths. Even in the case of ignition noise, the energy disibution passband divisions or spectral components would e equal for situations where the present invention is to e used. This is true because the ignition noise repetition rate is generally very low, with the result that the spacing between spectral components is relatively quite small and a large number of almost equal ignition noise energy components pass through each of the bandpass filters.

When a signal is not being received, all the bandwidth spectrum dividing filters thus have approximately equal noise output levels. However, when a signal is received, this equality is upset. It is accordingly possible to produce a squelch control voltage which varies as a function of whether or not the bandpass filter outputs are essentially equal. This is the operating factor upon which the squelch control system of the present invention relies. It is to be noted that when a narrowband signal is present, and because the IF spectrum is segmented by a number of bandpass filters, the signal-to-noise (S/N) ratio of the energy within the filter passing the narrowband signal is greatly improved, as compared with the signal-to-noise ratios of the energies in the other filters, so squelch circuit control responsive to a comparison of the energy levels of the various filter outputs can be quite sensitive and is more accurately responsive to signal presence than is the case when squelch control is effected by sensing the total energy present in the passband.

To summarize certain of the characteristic objects and features of the present invention, its advantages include the following: improvement of the signal-to-noise ratio of a narrowband signal received by a wideband receiver; improvement of the signal-to-interference ratio of a wideband receiver when a narrowband signal and interference energy are separated in frequency by a frequency difference greater than the frequency spectrum of the narrowband signal; provision in a wideband receiver for receiving narrowband signals of the capability of selecting from among various signals at various strengths and with various small frequency differences within the receiver passband only the strongest such signal, or the next strongest signal, or the second strongest such signal, or the third strongest such signal, etc.; provision in a wideband receiver of a mode of squelch circuit operation which can effectively distinguish between signal energy in only a part of the receiver passband and noise energy distributed substantially uniformly in the passband, with the squelch sensitivity being directly related to signal energy level rather than total energy level; provision in a wideband receiver of squelch control means not requiring careful threshold level adjustment; provision of squelch circuit control means capable of operating at very low signal-to-noise ratios; and provision in a wideband receiver of means by which the selectivity characteristics of the receiver can be quickly and simply altered to meet varying operating conditions.

These and other objects, features, characteristics and advantages of the present invention will be apparent from the following specific description of certain typical and therefore non-limitive forms thereof, taken together with the accompanying illustrations, wherein like numerals refer to like components, and wherein.

Figure 1:
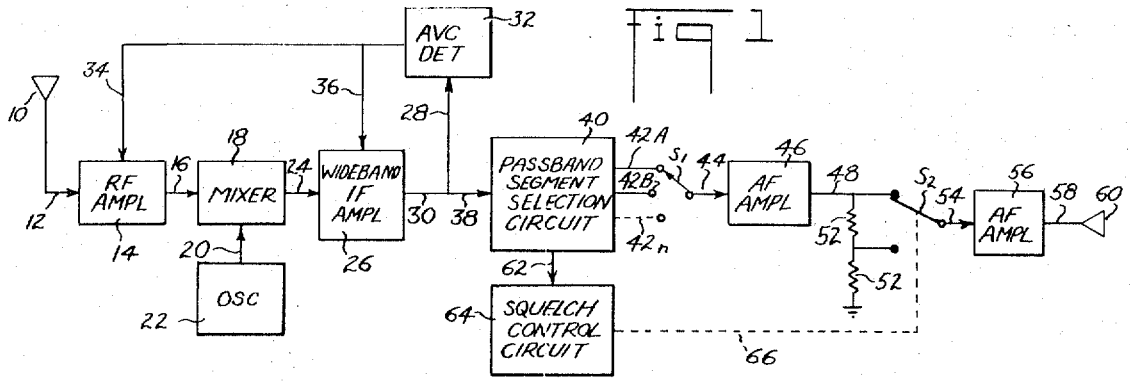
FIG. 1 is a simplified block diagram of a superheterodyne type wideband receiver embodying both the passband segment selection feature and the squelch circuit control feature of the present invention.

FIG. 1 shows in simplified block form a superheterodyne type receiver embodying the present invention, both as to its passband segment selection aspects and as to its squelch circuit control aspects. In a manner conventional per se in wideband superheterodyne receivers, the receive comprises an antenna 10 delivering an input 12 to radio frequency (RF) amplifier 14, the output 16 from which goes to mixer 18 along with an output 20 from local oscillator 22, with mixer output 24 being fed to one or more sideband IF amplifier stages designated at 26, a portion 28 of output 30 from the wideband IF amplifier section 26 being fed to an AVC detector stage 32 from which feedback outputs 34 and 36 are fed to the RF amplifier 14 and the wideband IF amplifier section 26. As also conventional, AVC detector stage 32 functions to regulate the gains of the RF and IF amplifier stages 14 and 26 so as to produce a substantially constant amplitude output 30 from the wideband IF amplifier section 26 over a considerable range of signal level at input 12.

A portion 38 of the output 30 from wideband IF amplifier section 26 is fed to a passband segment selection circuit, generally designated at 40, of a design according to the present invention, as discussed in more detail below in connection with FIGS. 2, 3 and 4. Passband segment selection circuit 40 develops an audio frequency output which contains only a part of the energy of the receiver IF passband. In the simplest form of circuit (FIG. 2), only that part of the passband is selected which contains the strongest signal. However, in the preferred form of circuit (FIG. 4), selection circuit 40 develops a "strongest" signal output as indicated at 42A, a "second strongest" signal output as indicated at 42B, and can also provide further progressively weaker signal outputs if desired, a "weakest" signal output being shown at 42n in FIG. 1, for purposes of illustration in this respect.

Whichever of the signal outputs 42A, 42B, 42n is desired as the receiver output is selected by manual control of multi-position switch S1 and from there delivered as input 44 to one or more audio frequency (AF) amplification stages generally designated at 46, the output 48 from which is applied across load resistances 50, 52, said resistor 52 being the "squelch" load and the resistors 50 and 52 constituting the "full sensitivity" load in the squelch circuit, the nature of the output being determined by the position of squelch relay contact S2 (shown in FIG. 1 in its "squelch off" or "receiver operative" position). The audio signal output selected by said squelch contact S2 is then applied as an input 54 to one or more additional AF amplification stages, generally designated at 56, from whence an output 58 is fed to suitable audio signal reproduction means such as speaker 60.

The passband segment selection circuit 40 preferably also develops an output 62 indicative of signal presence and applied according to the present invention to control a squelch control circuit generally designated at 64, which in turn functions to automatically operate squelch control contact S2, such manner of control being diagrammatically designated in FIG. 1 by broken line 66. Said squelch control circuit and the manner of control thereof by selection circuit output 62 are shown in more detail in FIG. 5 and discussed below in connection therewith.

Figure 2:
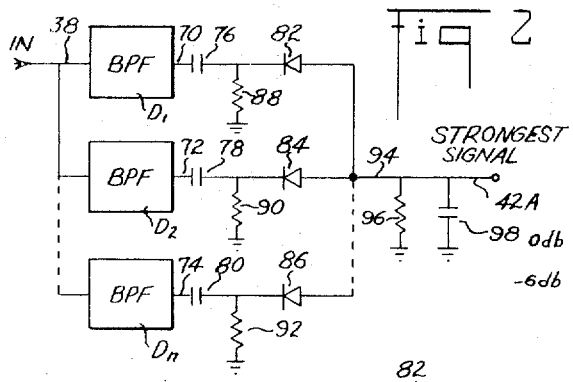
FIG. 2 is a block and schematic diagram of a portion of the passband segment selection circuit of the receiver shown in FIG. 1.
Figure 3:
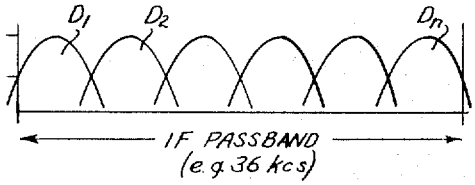
FIG. 3 is a graphical presentation of the spectral distribution of the array of bandpass filter utilized in the passband segment selection circuit shown in FIG. 2.

FIG. 2 is a block-schematic drawing of a portion of the passband segment selection circuit 40, showing the components thereof by which the "strongest" signal output 42A is developed. In FIG. 2, the IF input 38 is fed to a parallel array of bandpass filters (BPF) D1, D2, Dn. Each of the bandpass filters D1, D2, Dn preferably has a passband substantially equal to the spectrum of the narrowband signal received by the receiver (such as a passband of 6 kcs. where the narrowband signal comprises a carrier modulated at ±3 kcs.), and the total number of bandpass filters D1, D2, Dn is selected so that the bandpass filters collectively span the IF passband of the receiver. Thus, in the typical case illustrated at FIG. 3, each of the bandpass filters D1, D2, Dn has a passband of 6 kcs. (between −6 db points), and a total of six bandpass filters are employed in the selected case where the narrowband signal is modulated at ±3 kcs. and the IF passband of the receiver is 36 kcs. A full illustration of this arrangement involving a total of six bandpass filters would of course require a showing in FIG. 2 (and also in FIGS. 4, 5 and 6 discussed below) of a total of six bandpass filters. However, since the branch circuitry employed with each of the bandpass filters is the same, and since the total number of bandpass filters will be varied according to particular design considerations, the illustrations at FIG. 2 et seq. show three of the bandpass filters, D1 being the first (lowest frequency) bandpass filter, D2 being the second (next lowest frequency) bandpass filter, and Dn being the last (highest frequency) bandpass filter making up the parallel array, with broken line connections to the circuitry associated with filter Dn being used to show that additional like filters and branch circuitry may be interposed.

The respective outputs 70, 72, 74 from filters D1, D2, Dn are fed through coupling capacitors 76, 78, 80 to the cathodes of respective diodes 82, 84, 86, with respective direct current (DC) return resistors 88, 90, 92 being provided. The respective plates of the diodes 82, 84, 86 are all joined together so as to provide a common output at 94, resistor 96 and IF shunt capacitor 98 providing a common load so that the strongest signal output 42A is at audio frequency (AF), i.e. is a demodulated signal.

The strongest signal segment selection circuit shown at FIG. 2 functions as follows. Assuming the strongest signal falls within a given bandpass filter passband, say that of filter D1, the strongest IF wave is fed to diode 82 which, in conjunction with the common load 96, 98, demodulates the wave producing an AF wave across load resistor 96 as well as a negative DC voltage component in output 94. This negative DC voltage component back biases the other diodes 84, 86 and therefore signals or noise components falling within the passbands of their respective associated filters D2, Dn are excluded from the output 94. Thus, the diodes 82, 84, 86 develop a single output and function as both demodulators and as gates, the gating action providing that the detector associated with the bandpass filter having highest energy level operates to detect and pass that signal energy, while the other detector-gates block passage of signals from the other bandpass filters. The various bandpass filters in effect function to separate the energy in the receiver passband into spectral segments, and the associated diodes function to compare the relative energy levels of the energies at the various segments, and further function to select as an output only that energy segment (or possibly plural segments if the energy levels therein are essentially equal) as the detection stage output, i.e. the receiver output.

In some cases it is desirable to be able to select the next to strongest signal in the receiver passband, to the exclusion of the strongest signal, or to select an even weaker signal to the exclusion of stronger signals.

Figure 4:
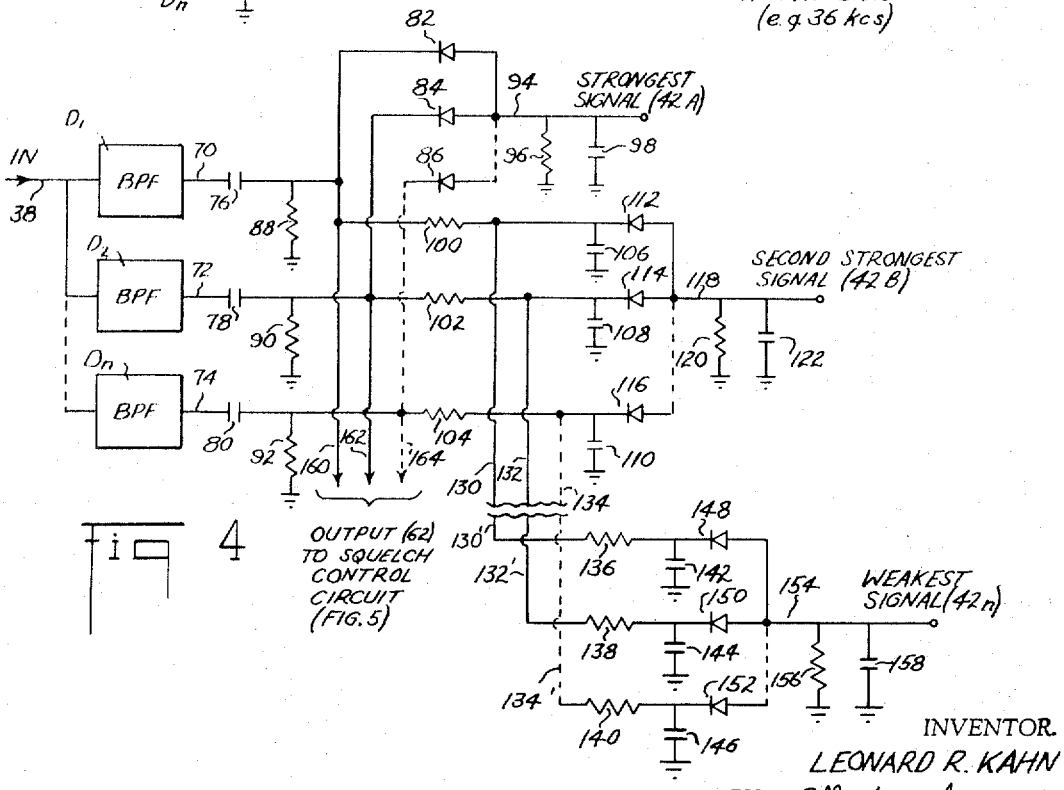
FIG. 4 is a block-schematic presentation of the passband segment selection circuit of the receiver shown in FIG. 1, including a parallel array of bandpass filters and gating means enabling optional selection of a signal of any relative strength to the exclusion of other signals in the passband, and further showing means deriving squelch circuit control outputs from said passband filters.

Circuitry for selection of signals of various strengths, to the exclusion of other signals, is shown schematically in FIG. 4. In this circuit, and in addition to the circuit components by which strongest signal output 42A is developed as above discussed, a second set of diode detection and gating means are employed which select and isolate the filter output having the second largest energy level. In addition, as shown in FIG. 4, a third set of diode detection and gating means can be employed to select and isolate a third largest or "weakest" filter output. In genral, the number of arrays of diode detection and gating ıeans can be equal to or less than the number of band-ıass filters D1, D2, Dn used; however, in practice only a tronger signal output 42A and a second strongest signal ıutput 42B would be all the outputs normally required.

The second strongest output 42B is developed in the ircuit shown in FIG. 4 in the following manner. By way f typical example an operational condition is assumed /here filter D1 is segregating the strongest signal at a iven instant and the next strongest signal is being segre-ated by filter D2, the amplitude of the output from lter D1 being 20 v. RMS and the amplitude of the out-ut from filter D2 being 10 v. RMS. Under these circum-tances the DC bias produced by the diode 82 across ɔad 96 is −16 volts, and the DC current flowing through )C return resistor 88 produces a DC potential thereat f +4 volts. Since the peak of the energy from filter D2 ; less than the −16 volts produced across load resistor 6, no current flows through diode 84 and therefore no )C potential is developed across its associated DC return esistor 90. In the second strongest signal selection circuit hown in FIG. 4, respective resistors 100, 102, 104 and apacitors 106, 108, 110 are lowpass filters (LPF) which ttenuate the IF by a suitable factor, say 10:1. Thus, as-uming that the DC return bias at the input to lowpass lter 100, 106 is +4 volts, the back bias is sufficient to ut off diode 112 since the attenuated IF signal appear-ıg at the cathode of diode 112 has an amplitude of ±2 olts R.M.S. The input to lowpass filter 102, 108, does ıot include any back bias, since there is no current flow hrough DC return resistor 90, and the originally ±10 olt RMS signal input to said lowpass filter 102, 108 ap-ıears at the cathode of diode 114 as a signal having an mplitude of ±1 volt RMS. In the presence of this signal, nd without any DC back bias, diode 114 conducts and he demodulated wave therefrom appears at the common ıutput 118 across load resistor 120 and shunt capacitor 22, said output 118 being the second strongest signal 2B. As will be apparent, the relatively strong output at 18 from conduction of diode 114 blocks any output rom diode 116, receiving a lesser strength signal from ıandpass filter Dn through lowpass filter 104, 110, this ondition occurring in the same manner as any outputs rom diodes 84, 86 are blocked by the output from diode 2 in the strongest signal selection example above dis-ussed.

In a similar fashion, and as also shown in FIG. 4, a weakest" signal output 42n can also be selected, the se-ɛction circuit therefor including signal outputs 130, 132, 34 from the cathode sides of the diode array of the ıevious signal selection circuit. Assuming no inter-ıediate stages, said outputs become respective inputs 30′, 132′, 134′ to the respective lowpass filters com-ırising resistors 136, 138, 140 and capacitors 142, 144, 46 to diodes 148, 150, 152, with the weakest signal ppearing as the output 154 across load resistor 156 and hunt condenser 158 because of back biasing of the other liodes 148, 150 in the circuit diode 152 being conductive nd diodes 148, 150 being nonconductive in this instance.

Figure 5:
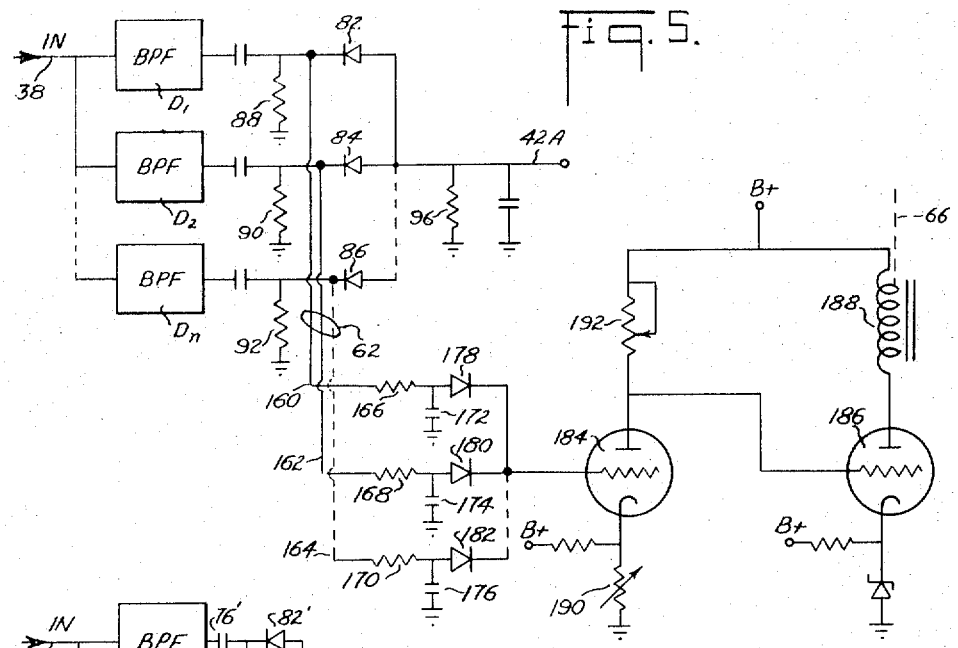
FIG. 5 is a simplified block-schematic diagram showing schematically a typical squelch circuit control arrangement characteristic of the invention.

The passband segment selection circuit shown in FIG. · also includes a control signal 62 to the squelch control ircuit shown at FIG. 5. Said control signal 62 com-ırises outputs, shown in FIGS. 4 and 5 at 160, 162, 164, espectively, from the cathode side of respective diodes 2, 84, 86 in the strongest signal selection circuit.

The principle of operation of the squelch control tech-ıique of the present invention can best be understood ıy first considering the spectrum characteristics of noise. 'he types of noise experienced by communication ystems can be considered to be either "thermal" or shot" noise which is generally developed in resistors or ıbes or transistors, or "impulse" noise which is gener-ted in ignition or other forms of rotary electrical equip-nent. In the case of "thermal" or "shot" noise, which is lso known as "white" noise, the noise may be considered to be produced by an extremely large number of individual noise generators and theory indicates that for frequencies generally used for communications purposes the spectrum distribution of the energy involved in this type of noise is uniform, or essentially so. The other classification of noise is "impulse" noise, the spectrum of which is composed of lines that are spaced at harmonics of the repetition rate at which the noise is generated. Generally, the width of the noise pulse is very short so that noise energy of this type is encountered even in the VHF and UHF frequency ranges. Thus, even for impulse noise of the type generally encountered in mobile communications operations, the noise within a receive or filter having a bandwidth of a few thousand cycles, more or less, can be considered to be essentially uniform.

The general uniformity of the noise energy distribution within the passband of a wideband receiver is the underlying basis of the squelch control system of the present invention.

FIG. 5 illustrates a simplified block-schematic diagram of such a squelch control system. The intermediate frequency passband is separated into frequency segments as above described, by use of bandpass filters D1, D2, Dn, and the outputs of said bandpass filters are fed to the respective detection and gating diodes 82, 84, 86, with a positive DC voltage being generated across whichever DC diode return resistor 88, 90, 92 is associated with the conductive diode. If only noise is being received at any given time, then the output energy from each of the bandpass filters D1, D2, Dn is of a low order and essentially equal to the energy in the other filter outputs, with the result that the average currents flowing through each of the diode return resistors 88, 90, 92 are substantially equal and are of such a low value in each instance that the input is insufficient to cause the squelch relay control circuit to operate. The squelch relay control circuit comprises the respective lowpass filters formed by resistances 166, 168, 170 and capacitors 172, 174, 176 and respective diodes 178, 180, 182 and vacuum tubes 184, 186, squelch control relay 188 being the plate load of tube 186. However, in the case where a signal is received in one of the bandpass filters D1, D2, Dn, and furthermore assuming that the amplitude of the signal is large enough to make the level of the output from one of the filters D1, D2, Dn substantially greater than the outputs of the other filters, then the associated diode 82, 84, or 86 becomes conductive, cutting off the other diodes, with the result that all of the current passing through the output load resistor 96 passes through but one of the return resistors 88, 90, 92, generating enough increase in voltage at the grid of tube 184 to make normally nonconductive tube 184 conductive and normally conductive tube 186 nonconductive, deenergizing squelch relay 188 and by mechanical linkage 66 changing the position of relay contact S2 (FIG. 1), establishing said relay contact S2 in the "receiver sensitive" position. Variable cathode and plate load resistances 190, 192 in circuit with tube 184 provide adjusting means for the squelch activation level.

In FIG. 5, the various diodes 178, 180, 182 function to avoid an averaging of the DC voltage, and accomplish this result by isolating the grid of tube 184 from all of the other diode diversity circuits because of the back biasing of these other diodes, since their respectively associated diodes 82, 84, 86 are nonconductive in the situation where a relatively strong signal (i.e. energy level) exists in but one of the bandpass filters D1, D2, Dn. Thus, when the filter outputs are sufficiently different in energy level to make only one of the diodes 82, 84, 86 conductive enough to back bias and cut off the other diodes, the circuit shown at FIG. 5 detects the difference between signal level and noise level and a signal-over noise type squelch control is realized. Also, it is to be noted that the signal-to-noise ratio of whichever individual bandpass filter output is used to control squelch is considerably better than the signal-to-noise ratio of the total IF passband. For example, if ten bandpass filters are used and assuming the narrowband signal falls entirely within one filter passband, the signal-to-noise ratio of the individual bandpass filter output is 10 db better than the signal-to-noise ratio of the entire IF passband considering "thermal" or "shot" noise. In the case of "impulse" noise, the gain is 20 db for a ten bandpass filter segment selection system. With signal-to-noise improvement of this order, it is relatively easy to detect signal presence, and to effect squelch control accurately responsive to signal presence.

Figure 6:
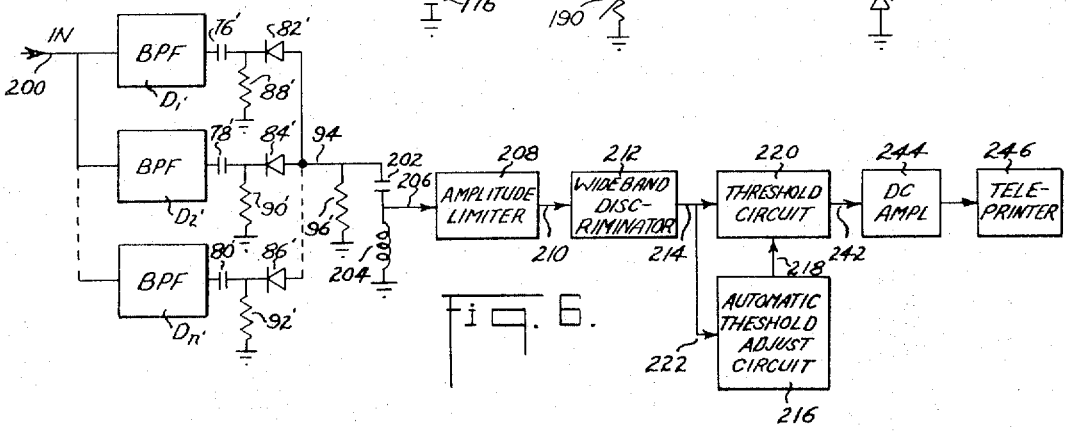
FIG. 6 illustrates a modified form of the invention, showing a typical application thereof to frequency shift keying (FSK) type radio telegraph signal reception.

The present invention also has significant utility with regard to improvement of performance of radio telegraph data transmission systems. In this respect, and by way of further example, FIG. 6 illustrates the use of the invention in a frequency shift keying (FSK) type radiotelegraph receiver. In a conventional signal FSK channel receiver involving a transmission rate of 60 to 100 words per minute, a relatively large frequency shift is normally used, the extent of frequency shift being on the order of 300 to 1000 c.p.s. For optimum signal-to-noise ratio in the output, under poor conditions insofar as input signal-to-noise ratio is concerned, the amount of shift should be on the order of 85 c.p.s., but because the receiving equipment must be able to accommodate large amounts of drift as is prevalent in conventional FSK receiving and transmitting equipment, much wider frequency shifts are used. By automatically selecting only that segment of the IF passband which contains the signal at any given instant, the present invention alleviates this problem by allowing the FSK receiver to respond to the signal over a relatively wide frequency range but with only a relatively narrow response with respect to noise and interference energies.

As shown at FIG. 6, the IF section output of an otherwise conventional FSK receiver is fed as input 200 to a parallel array of bandpass filters D1′, D2′, Dn′, thence through respective coupling capacitors 76′, 78′, 80′, and across respective DC return resistances 88′, 90′, 92′ to the cathodes of diodes 82′, 84′, 86′, the plates of the latter being connected together to provide a common output 94′ across load resistor 96′. Whichever of the diodes 82′, 84′, 86′ is being maintained conductive (by its associated filter D1′, D2′, Dn′, having the signal present therein at any given time), the conductive diode functions to load the common load resistor 20 and cut off the other of the diodes 82′, 84′, 86′. Accordingly, only the signal and noise from the bandpass filter D1′, D2′, Dn′ passing the most energy is fed to the output load 96′. A series resonant circuit composed of capacitor 202 and inductance 204 selects the IF component of the energy loading output load 96′ of the segment selector circuit, and the IF input 206 thus selected if fed to amplitude limiter 208 which removes amplitude modulation noise and provides an input 210 to the wideband discriminator 212. Said wideband discriminator 212 responds to any IF wave passed by any of the bandpass filters D1′, D2′, Dn′ and the output 214 from wideband discriminator 212 is a keying wave having a characteristic frequency separation between mark and space frequencies.

In order to operate the associated teleprinter, it is necessary to determine at any instant whether a mark or space is being transmitted. Assuming that a more positive voltage is produced in the output 214 from the discriminator 212 if a mark is being received and a less positive voltage if a space is being received, then the automatic threshold adjust circuit 216 produces a voltage input 218 to a threshold circuit 220 which is an average of the mark and space voltages. For example, if under certain frequency drift conditions filter D1′ is active and the discriminator 212 produces +10 v. for mark signals and −2 v. for space signals, the automatic threshold adjust circuit would produce an average signal output 218 at +4 v. If the equipment drifts so that filter D2′ is active and the discriminator 212 produces a signal at +8 v. for marks and a signal at −4 v. for space signals, the automatic threshold adjust circuit 216 would produce an output 218 at +2 v.

Figure 7:
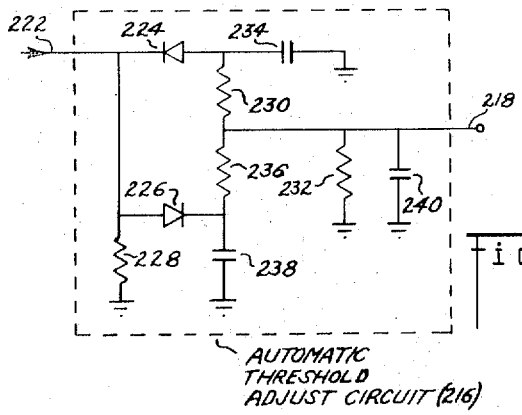
FIG. 7 is a schematic showing of the automatic threshold adjust circuit of the receiver shown at FIG. 6.

FIG. 7 illustrates a schematic of the automatic threshold adjust circuit 216. A portion 222 of the discriminator output 214 is fed to two diodes 224, 226. Diode 224 is connected so that negative pulses are peak detected and diode 226 provides peak detection of positive pulses. The current flow path for diode 224 is through return resistor 228, resistor 230, and finally resistor 232, a voltage being produced across resistor 232 which is a function of the peak amplitude of the negative pulse fed to the threshold adjust circuit. Capacitor 234 is large enough to make the circuit function as a peak detector. Similarly, the current flow path for positive pulse peak detection diode 226 includes return resistor 228, resistor 236 and resistor 232, with capacitor 238 being large enough to make the circuit function as a peak detector. The voltages thus produced across resistor 232 are there averaged and provide an output which is an arithmetic mean of the peak negative pulses and peak positive pulses. Capacitor 240 stores this average DC voltage over a long enough period so that the voltage does not follow the keying but rather the average voltage. In this manner the desired centering for the threshold circuit 220 is automatically maintained. Threshold circuit 220 is thus biased by adjust circuit 216 so as to be able to distinguish the mark voltages and space voltages, and the output 242 therefrom feeds DC amplifier 244 which in turn functions to key the teleprinter 246 or other utilization device.

In the FSK circuit shown in FIG. 6, it is to be again noted that a considerable improvement in signal-to-noise ratio is obtained and that the signal-to-noise ratio of the output signal is essentially that of the best narrowband signal in the receiver passband (i.e. the system in effect provides the same signal-to-noise advantage as would be provided by a narrowband FSK system), without any requirement of high frequency stability in either the FSK transmitter or the FSK receiver.

From the foregoing, various modifications and other adaptations of the invention, or certain aspects thereof, will be apparent to those skilled in the art to which the invention is addressed, within the scope of the following claims.

What is claimed is:

1. In a communications receiver having an intermediate frequency passband substantially wider than the bandwidth of the signal received by the receiver, the improvement comprising:

(a) a plurality of bandpass means separating the energies in the intermediate frequency passband of the receiver into a plurality of frequency segments, each such bandpass means having a passband about equal to the bandwidth of the received signal;

(b) gating means respectively comparing the energy levels in each of such passband means and passing only that passband energy having a selected energy level different from the energy levels in other of the passband means; and (c) means utilizing the gated energy as the receiver output.

2. A communications receiver according to claim 1, wherein said gating means passes only the bandpass energy wherein the energy level is strongest.

3. A communications receiver according to claim 1, wherein said gating means passes only the bandpass energy wherein the energy level is less than the energy level in another bandpass means.

4. A communications receiver according to claim 1, wherein said gating means passes only the bandpass energy wherein the energy level is of lesser strength than the energy levels in a plurality of other bandpass means.

5. In a communications receiver having an intermediate frequency passband, and receiver output means inluding a squelch circuit functioning to maintain the receiver fully sensitive only when the received signal has at east a predetermined energy level, the improvement comprising:

(a) a plurality of bandpass means separating the energies in the immediate frequency passband of the receiver into a plurality of frequency segments;

(b) gating means respectively comparing the energy levels in each of such passband means and providing a squelch control signal only when a substantial difference exists in the respective energy levels in such bandpass means; and (c) means applying such squelch control signal to said squelch circuit.]

[6. A communications receiver wherein a received signal occupies an intermediate frequency passband substantially wider than the bandwidth of the received signal, and wherein a squelch circuit functions to control eceiver output responsive to signal strength, the improvement comprising:

(a) a plurality of bandpass means separating the energies of the intermediate frequency passband of the receiver into a plurality of frequency segments, each such passband means having a passband about equal to the bandwidth of the received signal;

(b) gating means respectively comparing the energy levels in each of such bandpass means and passing only that bandpass energy having a selected energy level different from the energy levels in the other of the bandpass means; and (c) receiver output means, including said squelch circuit, responsive to the gated bandpass energy, with the selected energy operating such squelch circuit to render the receiver fully sensitive only when the selected energy is substantially greater than the energy levels in such other bandpass means.]

7. A communications receiver according to claim 6, vherein said squelch circuit is responsive to the bandpass nergy having the greatest energy level.

8. A communications receiver according to claim 6, omprising at least three bandpass means.

9. In a wideband radio receiver used to receive a narow band signal wherein the receiver comprises radio requency amplification means, and intermediate frequency amplification section, detection means, and reeiver output means, the improvement comprising:

(a) a plurality of bandpass means separating the energies in the intermediate frequency passband into various frequency related passband segments, each occupying a frequency spectrum about equal to the frequency spectrum of the received narrowband signal;

(b) gating means respectively comparing the energy levels of the various passband segments and selecting and detecting only the energy in one such bandpass means while blocking the energy in the other such bandpass means; and (c) means utilizing the gated energy as the receiver output.

10. A communications receiver according to claim 9, urther comprising a squelch circuit, and wherein such gated energy controls the squelch circuit to render said eceiver fully sensitive only when the selected energy rom one bandpass means is substantially greater than he energy levels in at least some of the other bandpass neans.

11. In a wideband radio receiver used to receive narowband signals wherein the receiver comprises radio requency amplification means, wideband intermediate requency amplification section, detection means, and udio frequency amplification means, the improvement omprising a parallel array of bandpass filters separating the energy in the intermediate frequency passband nto spectral segments, each of said bandpass filters having a passband substantially equal to the bandwidth of said narrowband signal, means comparing the energy levels of the various said spectral segments, and means detecting and selecting only the energy in part of said spectral segments as the input to said audio frequency amplification means.

12. A wideband receiver according to claim 11, comprising at least three bandpass filters, each having a passband substantially equal to the bandwidth of said narrowband signal.

13. A wideband receiver according to claim 12, wherein each passband filter has an effective passband of about six kilocycles.

14. A wideband receiver according to claim 13, wherein the passband of said intermediate frequency amplification section is about thirty-six kilocycles with six said bandpass filters collectively spanning said intermediate frequency passband.

15. A wideband radio receiver used to receive a narrowband signal characterized by keyed carrier shift for data transmission, the signal path in said receiver comprising radio frequency amplification means, a wideband intermediate frequency amplification section, means separating the energy in the intermediate frequency passband into various frequency related segments, means comparing the energy levels of the various said frequency related segments and producing as an intermediate frequency output only the energy in the frequency segment having the highest energy level, amplitude limiter means removing amplitude modulation energy from said intermediate frequency output, and wideband discriminator means converting said intermediate frequency output to an output reflecting the keyed characteristics of said narrowband signal.

16. A wideband radio receiver according to claim 15, characterized by a given DC voltage output responsive to a given carrier frequency and by another DC voltage output responsive to a shifted carrier frequency, the said receiver further comprising peak pulse detection means automatically maintaining the output from said wideband discriminator means at an average value of zero volts.

17. In a wideband radio receiver used to receive relatively narrowband electromagnetic signals; a signal path comprising wideband intermediate frequency amplification means; a parallel array of bandpass filters, each occupying a passband within the intermediate frequency of said receiver passband, with said filters collectively spanning the said intermediate frequency passband; a parallel array of diode detection means, each receiving the output from a different one of said bandpass filters; means combining the outputs from said diode detection means so that in the event of any substantial difference in energy level of the respective energies passed by the respective bandpass filters, the diode detection means associated with that bandpass filter having the highest energy level operates to detect and pass signal energy, while the other diode detection means block passage of signals from the other bandpass filters.

*18. In a communications receiver having a passband, and receiver output means including a squelch circuit functioning to maintain the receiver fully sensitive only when the received signal has at least a predetermined energy level, the improvement comprising:*

*(a) a plurality of bandpass means separating the energies in the passband of the receiver into a plurality of frequency segments;*

*(b) gating means respectively comparing the energy level in each of such passband means individually with the energy levels in every other such passband means and providing a squelch control signal only when a substantial difference exists in any one of the respective energy levels in such bandpass means; and*

*(c) means applying such squelch control signal to said squelch circuit.*

*19. A communications receiver having an input passband which is substantially wider than the bandwidth of a received signal, and wherein a squelch circuit functions to control receiver output responsive to signal strength, the improvement comprising:*

*(a) a plurality of bandpass means separating the energies of the passband of the receiver into a plurality of frequency segments, each such passband means having a passband about equal to the bandwidth of the received signal;*

*(b) gating means respectively comparing the energy levels in each of such bandpass means and passing only that bandpass energy having a selected energy level different from the energy levels in the other of the bandpass means; and*

*(c) receiver output means, including said squelch circuit, responsive to the gated bandpass energy, with the selected energy operating such squelch circuit to render the receiver fully sensitive only*

*when the selected energy is substantially greater than the energy levels in such other bandpass means.*

References Cited

The following references, cited by the Examiner, are of record in the patented file of this patent or the original patent.

UNITED STATES PATENTS

| | | | |
|---|---|---|---|
| 2,923,814 | 2/1960 | Smith-Janiz, Jr. | 325—477 |
| 3,044,018 | 7/1962 | Wilson | 325—320 |
| 3,112,452 | 11/1963 | Kirkpatrick | 325—479 |
| 3,126,449 | 3/1964 | Shirman | 325—474 |

RICHARD MURRAY, Primary Examiner

J. A. BRODSKY, Assistant Examiner

U.S. Cl. X.R.

325—320, 472, 477, 478, 489